T. Fessenden,
Axle Gage.
Nº 410.    Patented Sep. 25, 1837.
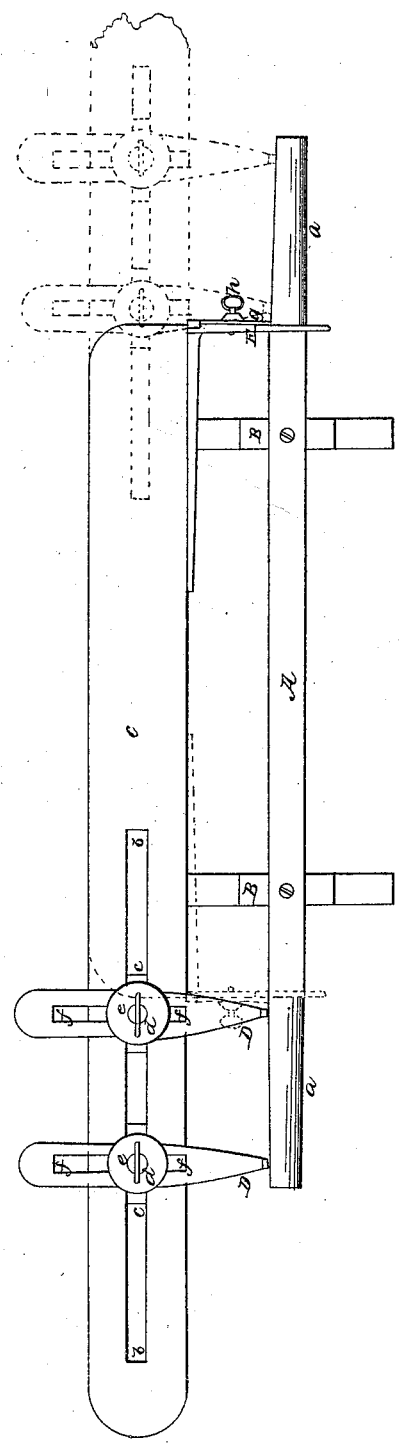

UNITED STATES PATENT OFFICE.

TIMOTHY FESSENDEN, OF BOSTON, MASSACHUSETTS.

METHOD OF SETTING AXLETREES AND IN THE MACHINERY USED THEREFOR.

Specification of Letters Patent No. 410, dated September 25, 1837.

*To all whom it may concern:*

Be it known that I, the said TIMOTHY FESSENDEN, of Boston, county of Suffolk, and State of Massachusetts, have invented, made, and applied to use a new and useful Improvement in the Manner of Setting Axletrees and Machinery to be Used Therefor.

The disposition, arrangement and use of the several parts of the improvement the principles thereof and several modes in which I have contemplated the application of that principle or character by which it may be distinguished from other inventions—together with those parts improvements or combinations I claim as my invention, or discoveries, I have fully set forth and described in the following specification and accompanying drawings.

The object of this machinery is to set the axis of the gudgeons of the axle in the same perpendicular plane, and also to give them the same inclination from a horizontal plane or in other words to give each such an angle that both wheels shall be equally " dished."

A represents the axle resting on a frame B, B constructed in a suitable manner of wood, iron or other proper material. a, a, are the gudgeons or journals of the axletree, which are to be turned of the same size prior to being welded together. C is a long straight bar of wood, iron or other metal, having a groove or slot b, b, formed therein. In this slot the sliders c, c, move back and forth and are so constructed as to admit of screws d, d, passing into corresponding female screws tapped in them. Proper shoulders are formed on their undersides so that when the screws d, d, are turned up against the washers e, e they confine the T pieces D, D, down to the bar. The T pieces are shaped as seen in the drawing or may be otherwise properly formed. The slots f, f, f f, admit of their being set in any positions.

E is a piece of metal applied to the opposite end of the bar C and resembling in appearance the letter Y. It has attached to it a small slide g' confined by a set screw working in a slot formed therein.

The above constitutes the apparatus, and the application of it to the axletree is as follows. The axle being properly supported on its frame the bar C is brought up to it, and the Y part applied to one of the gudgeons where it joins the square part of the axle, and the slide g' brought down until the edge touches the circumference of the axle—where it is clamped by the screw. Both of the T pieces are also made to rest against the side of the opposite gudgeon and screwed fast. The instrument is then reversed in the position denoted by the red lines and should there be any deviation of the axes of the gudgeons from a perpendicular plane it is at once perceived and can be rectified. The true " dish " of the gudgeons is obtained in the same manner by a similar process.

I claim as my invention and improvement,

The mode I have described of setting axletrees and also an apparatus constructed as herein mentioned for the above purpose.

In testimony that the above is a true description of my said invention I have hereunto set my hand this eighth day of May, A. D. eighteen hundred and thirty seven.

TIMOTHY FESSENDEN.

Witnesses:
  R. H. EDDY,
  THOS. GOSSELIN.